(12) United States Patent
Thompson et al.

(10) Patent No.: US 7,909,004 B2
(45) Date of Patent: Mar. 22, 2011

(54) CAM-LOCK LEASH

(76) Inventors: Spencer J. Thompson, Newbury Park, CA (US); Ken Edlauer, Newbury Park, CA (US)

( * ) Notice: Subject to any disclaimer, the term of this patent is extended or adjusted under 35 U.S.C. 154(b) by 1162 days.

(21) Appl. No.: 11/039,710

(22) Filed: Jan. 18, 2005

(65) Prior Publication Data
US 2005/0217610 A1    Oct. 6, 2005

Related U.S. Application Data

(60) Provisional application No. 60/537,859, filed on Jan. 20, 2004.

(51) Int. Cl.
*A01K 27/00* (2006.01)
(52) U.S. Cl. ......................... 119/797; 119/795
(58) Field of Classification Search ........... 119/795–798
See application file for complete search history.

(56) References Cited

U.S. PATENT DOCUMENTS

| | | | | |
|---|---|---|---|---|
| 3,072,097 A * | 1/1963 | Morchand | ...................... | 119/719 |
| 4,562,792 A * | 1/1986 | Pak et al. | ...................... | 119/797 |
| 4,828,210 A * | 5/1989 | Anderson et al. | ........ | 248/229.15 |
| 5,377,626 A * | 1/1995 | Kilsby et al. | .................. | 119/796 |
| 6,148,773 A * | 11/2000 | Bogdahn | ....................... | 119/796 |
| 6,526,918 B1 * | 3/2003 | Arnold | ............................ | 119/796 |
| 6,904,872 B2 * | 6/2005 | Muller | ........................... | 119/796 |
| 6,925,967 B1 * | 8/2005 | Woodruff | ...................... | 119/859 |

OTHER PUBLICATIONS

Cam. (n.d.). Dictionary.com Unabridged (v 1.1). Retrieved Aug. 15, 2007, from Dictionary.com website: http://dictionary.reference.com/browse/cam.*

\* cited by examiner

*Primary Examiner* — K S Smith
(74) *Attorney, Agent, or Firm* — Kelly Lowry & Kelley, LLP

(57) ABSTRACT

A leash assembly includes a housing having a hand grip. A leash forming part of the assembly includes a first end and a second end that defines a leash handle. An intermediate section of the leash is extendable and retractable through the housing. The assembly also includes features for allowing travel of the leash in a first direction through the housing in response to a user pulling on the leash handle, and simultaneously preventing travel of the leash in an opposite second direction through the housing. Another feature of the assembly allows selective disengagement of the leash so that it may travel in the opposite second direction through the housing.

20 Claims, 2 Drawing Sheets

CAM-LOCK LEASH

RELATED APPLICATION

This application claims the benefit of U.S. Provisional Application No. 60/537,859, filed on Jan. 20, 2004, and entitled CAM-LOCK LEASH.

BACKGROUND OF THE INVENTION

The invention relates generally to a leash assembly for controlling pets. More particularly, the present invention relates to a leash assembly with an adjustable length leash strap.

There is a great need for portable, efficient devices to control pets out for a walk or in any environment where a pet is not allowed to roam freely. For example, when a dog owner is walking his or her dog on a conventional single length leash connected to a collar around the dog's neck, it can be difficult to control the dog, even though the leash is attached to the dog. Typical leashes are 3 ft. to 5 ft. long and are made of a single length leash strap with a loop at one end to be gripped by the user and a connector at the other end for attachment to the collar around the dog's neck. In many situations (e.g., if the dog is being-walked in a crowd, and the dog is acting erratically, trying to visit other people or animals, etc.), it is best to control the dog by keeping him on a short leash, as the saying goes. This can be done by holding the dog's collar directly. However, this is not comfortable, does not work very well, and can result in the user losing their balance as this requires the person to stoop over to grasp and then hold the animal's collar.

Many different types of leashes have been employed to control pets. For example, there are leashes commercially available that have an additional loop sewn into the strap near or directly above the collar attachment hook. This design allows the person to grasp the leash within close proximity of the dog's collar, affording the person tighter control over the dog. However, this still leaves the person holding the leash with a loose length of leash that can get caught up in the person's feet unless the person wraps or twists the leash strap about their hands or arms. With respect to conventional single length leashes, these provide no way for the pet owner to "reel in" their pet by decreasing the length of the leash or otherwise adjust the length of the leash, without having to twist/untwist and wrap/unwrap the leash about their hands, arms, legs, and/or body. In another example, the retractable variable length leash has been gaining popularity for the last twenty years and has taken its place as a permanent pet product. However, these variable length designs do not allow the person to "reel" or pull in the length of the leash while the other end is attached to a pet straining against the leash in designs having a light spring powered wheel that retracts the cord or leash, but is not strong enough by itself to control and/or overcome the power of a pet, such as a dog, pulling against it. Additionally, these retractable cord style leashes are sold with disclaimers such as "Do not use this leash for disobedient or uncontrollable dogs" and come with specific weight limitations.

While leashes such as the ones described above may provide means of controlling a pet by preventing the pet from being able to go beyond a certain distance from the person holding the leash, such devices can always be improved to provide better control.

Accordingly, there is a need for a pet leash that allows the person holding the leash to "reel in" their pet held by the leash. There is a further need for a pet leash that allows the user to "reel in" the pet by pulling on a handle that is attached to the leash strap. There is an additional need for a pet leash that allows the user to adjust and lock in a desirable length of leash. There is an even further need for a pet leash that is ergonomically designed for a pet owner's hand. There is a need for a pet leash that allows a pet owner to use their own strength to overcome and control the pet straining against the leash. The present invention satisfies these needs and provides other related advantages.

SUMMARY OF THE INVENTION

The present invention is useful in a variety of ways. The present invention provides a pet leash that allows a person holding the leash to "reel in" their pet being held by the leash. The pet leash allows the person to "reel in" their pet by pulling on a handle that is attached to the leash strap. The present invention allows the user to adjust the length of the leash and lock the leash at a desirable length. The present invention is ergonomically designed for a pet owner's hand and allows a pet owner to use their own strength to overcome and control a pet straining against the leash.

In an embodiment of the present invention, a leash assembly has a housing that includes a hand grip. The leash assembly also has a leash that includes a first end and a second end defining a leash handle. An intermediate section of the leash is extendable and retractable through the housing.

The leash assembly includes means for allowing travel of the leash in a first direction through the housing in response to pulling on the leash handle, and simultaneously preventing travel of the leash in an opposite second direction through the housing. This allowing and preventing means includes a cam-lock for engaging the intermediate section of the leash.

The leash assembly also has means for selectively disengaging the preventing means which includes a rod for pivoting the cam-lock to disengage from the intermediate section of the leash. Disengagement of the cam-lock from the intermediate section of the leash allows the intermediate section of the leash to move freely through the housing. The cam-lock is spring biased to automatically engage the leash.

The housing defines an interior passageway through which the intermediate section of the leash extends. The hand grip and the housing are of unitary construction. The leash handle abuts the housing in an area generally overlying the hand grip when the intermediate section of the leash is at maximum operative length.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
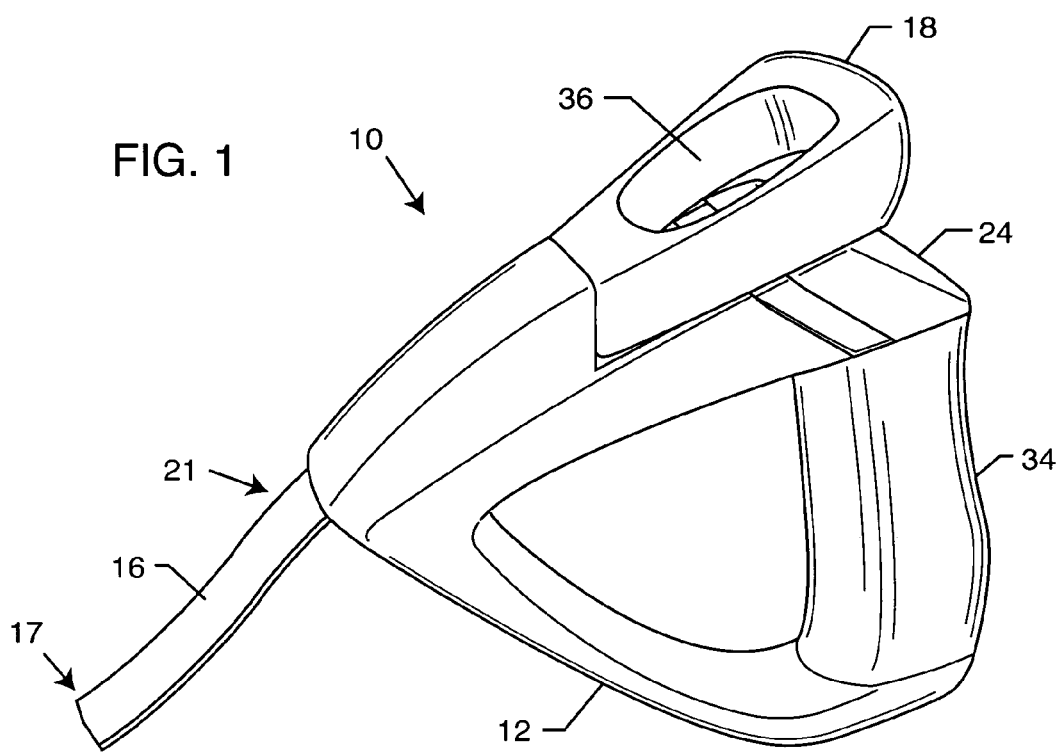
FIG. 1 is an orthogonal view of a leash embodying the present invention.
Figure 2:
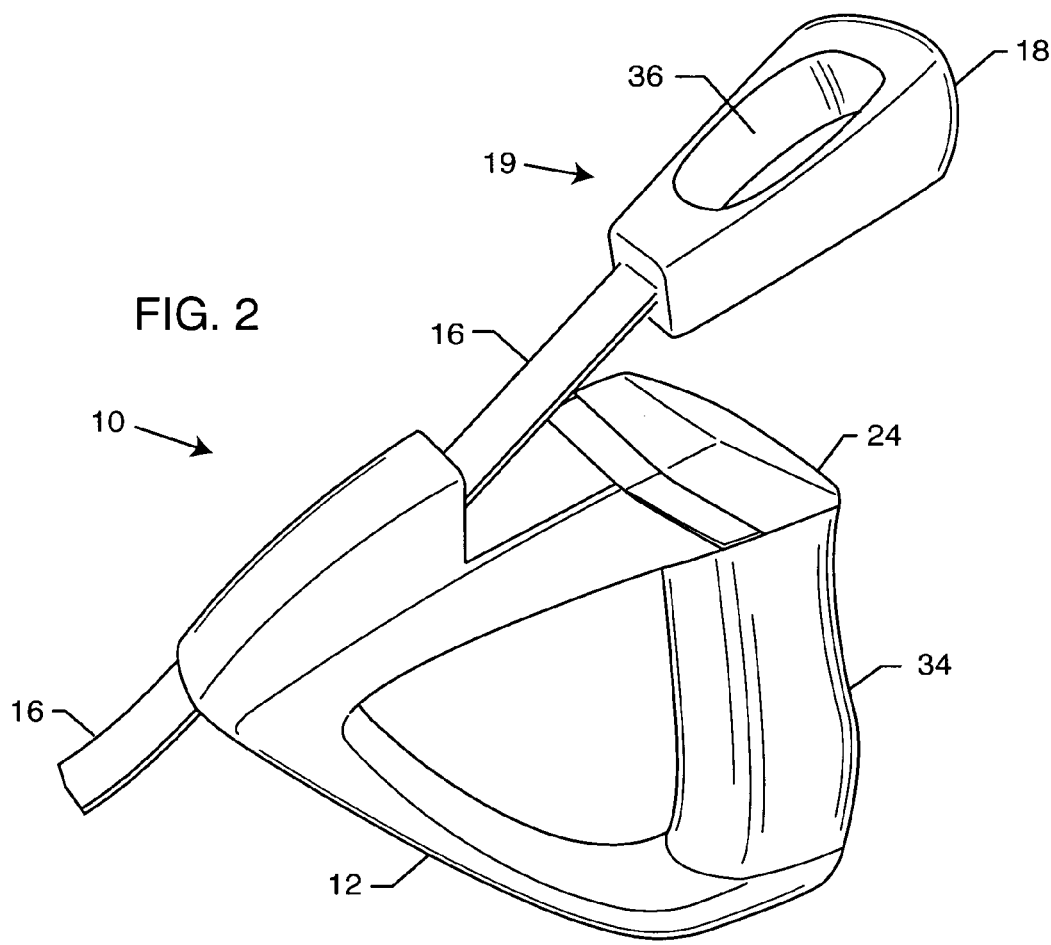
FIG. 2 is an orthogonal view of the leash of FIG. 1 with the leash pulled back rearward from the handle.
Figure 3:
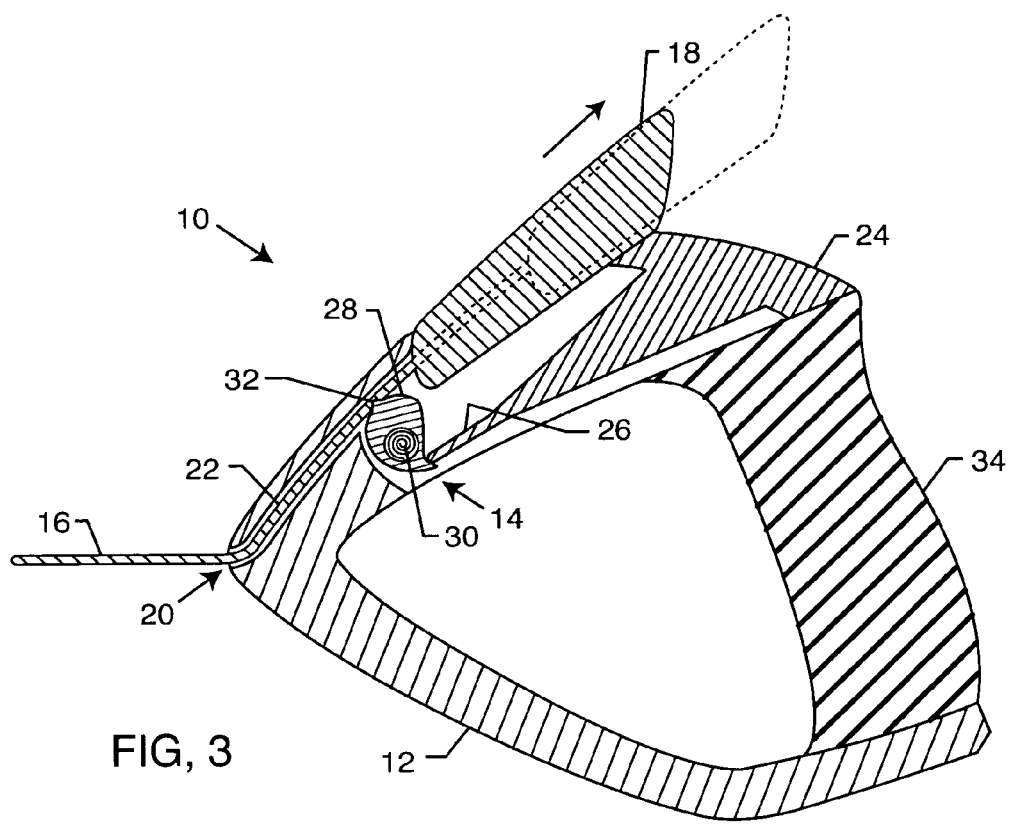
FIG. 3 is a cross-sectional side elevational view of the leash of FIG. 1.
Figure 4:
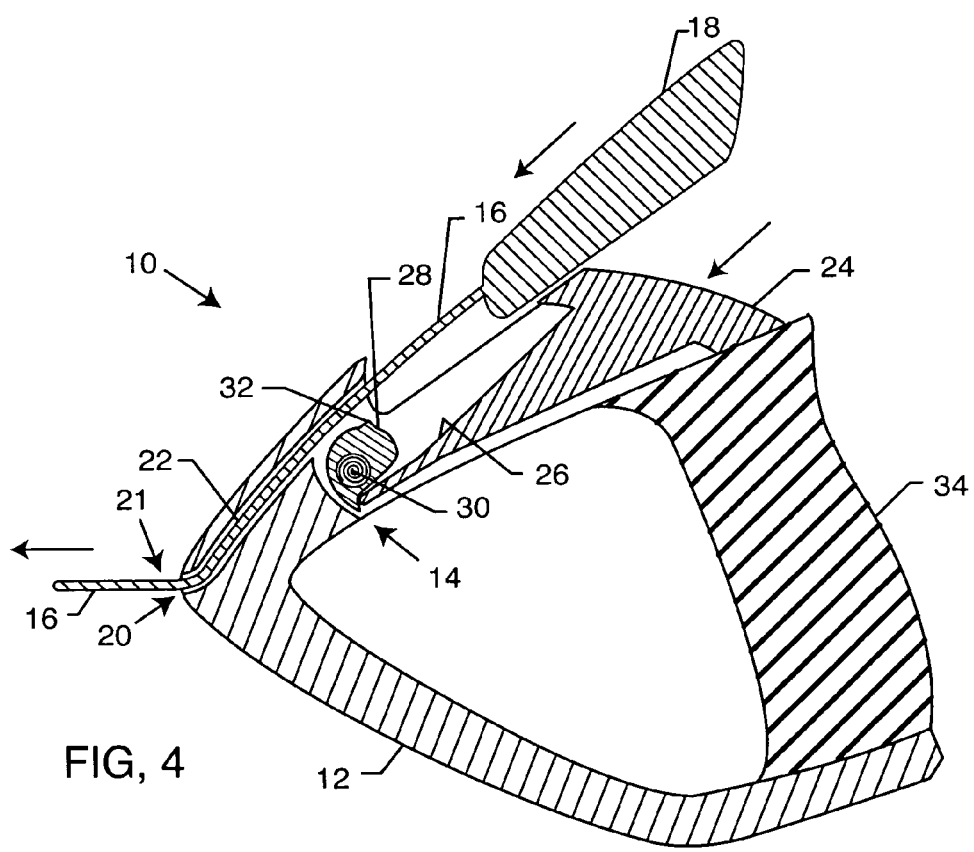
FIG. 4 is a cross-sectional side elevational view of the leash of FIG. 2.

As shown in the drawings for purposes of illustration, the present invention resides in a cam-lock leash. With reference to FIGS. 1-4, a leash assembly 10 includes a housing in the form of a pistol style grip handle 12 that has an integrated cam-lock assembly 14. The assembly 10 further includes a leash strap 16 having a hook (not shown) on one end 17 that is attached to the dog's collar (not shown), and a pull-handle 18 on the other end 19, which the user grabs to pull an intermediate section 21 of the leash strap 16 through an aperture 20 of the grip handle 12, along an interior passageway in the form of a ramp or guide 22 within the handle 12 and through the cam-lock assembly 14 to shorten the length of the leash strap 16 immediately and securely. The pull-handle 18 is sized and shaped so as to engage the grip handle 12. The guide 22 enables the strap 16 to be easily pulled through the handle 12 in either direction. The cam-lock assembly 14 allows travel of the leash strap 16 in a first direction through the grip handle 12 in response to a user pulling on the pull-handle 18 while simultaneously preventing the leash from moving in an opposite second direction through the grip handle 12. The assembly 10 also includes a cam-lock release button 24 which allows the user to control the length of strap 16 between the hook and the grip handle 12 by selectively disengaging the cam-lock assembly 14 from the leash strap 16. Pressing the release button 24 moves a pushrod 26 connected to the button 24 forward. The forward movement of the pushrod 26 rotates a cam-lock release lever 28 about a pivot point 30, releasing the intermediate section 21 of the leash strap 16 and allowing the strap 16 to freely move forward along the guide 22 to increase the lead length of the strap 16. The cam-lock 28 is spring-loaded and rotates about the pivot point 30. The spring-loaded cam-lock 28 automatically engages the leash strap 16. The cam-lock 28 includes a friction point 32 that comes into contact with the leash strap 16 when the cam-lock 28 is in a locked position. The friction point 32 is in the form of a ridge across the width of the cam-lock 28. This point 32 is offset from the axis of the cam-lock 28 so that as the leash strap 16 is pulled outward (toward the dog), the cam-lock 28 and friction point 32 is pulled even more tightly into contact with the leash strap 16. This keeps the leash strap 16 from moving toward the dog unless the release button 24 is depressed and the cam-lock 28 rotated. Conversely, if the person pulls the leash strap 16 in the opposite direction, the leash strap 16 can easily pass through the friction point 32 because of the offset nature of its design. As the leash strap 16 moves inward (toward the person) the cam-lock 28 and friction point 32 are pushed away from the leash strap 16, effectively opening the cam-lock 28.

The cam-lock 28 is sized and shaped such that, in the locked position, the cam-lock presses the strap 16 against the guide 22, preventing movement of the strap 16. The forward movement of the pushrod 26 causes the pushrod 26 to contact and rotate the cam-lock 28 such that the leash strap 16 is able to freely travel in either direction through the guide 22. The cam-lock assembly 14 does not allow the leash strap 16 to be pulled by the dog in the opposite direction unless the person depresses the cam-lock release button 24. The leash strap 16 may be made from a variety of materials including, without limitation, natural fibers, artificial fibers (e.g., NYLON), plastic, chain-links, or a combination of the foregoing. In one embodiment of the invention, the strap 16 may be 1 inch wide by approximately 4 feet long.

In use, the cam-lock assembly 14 allows the person to "reel in" the dog, by pulling on the pull-handle 18 that is attached to the adjustable leash strap 16. The strap 16 moves rearward through the cam-lock assembly 14 as the person pulls it. This allows the user to vary the length between the dog's collar and the user's hand, so the strap 16 can be set at an optimum length for any given situation.

The grip handle 12 is shaped to fit ergonomically within most people's hands. Additionally, the grip handle 12 is oriented so that the persons' hand, wrist, and arm are ideally positioned when the dog is pulling on the leash strap 16. The grip handle 12 includes a hand grip portion 34 covered by KRATON or other co-molded rubber handle for comfort. The grip portion 34 may also be covered by a foam rubber, NEOPRENE, or the like. The grip portion 34 and the grip handle 12 are of unitary construction. The pull-handle 18 abuts the grip handle 12 in an area generally overlying the grip portion 34 when the intermediate section 21 of the leash strap 16 is at maximum operative length.

The pull-handle 18 includes an aperture 36 through which the user may wrap their fingers so as to obtain a better grip on the handle 18 when pulling the leash strap 16 through the guide 22 of the grip handle 12.

The pull-handle 18 may be colored a different color than the grip handle 12 so as to clearly differentiate the two parts (e.g., the pull-handle 18 may be colored red while the grip handle 12 may be gray). The grip handle 12, leash strap 16, pull-handle 18, and grip portion 34 may all be the same or different colors.

The above-described embodiment of the present invention is illustrative only and not limiting. It will thus be apparent to those skilled in the art that various changes and modifications may be made without departing from this invention in its broader aspects. Therefore, the appended claims encompass all such changes and modifications as falling within the true spirit and scope of the invention.

What is claimed is:

1. A leash assembly, comprising:
a housing including a hand grip;
a leash including a first end, a second end defining a leash handle, and an intermediate section extendable and retractable through the housing;
controlling means for allowing travel of the leash in a first direction through the housing in response to pulling on the leash handle, and for simultaneously preventing travel of the leash in an opposite second direction through the housing; and
means for selectively disengaging the controlling means.

2. The leash assembly of claim 1, wherein the housing defines an interior passageway through which the intermediate section of the leash extends.

3. The leash assembly of claim 1, wherein the controlling means includes a cam-lock for engaging the intermediate section of the leash.

4. The leash assembly of claim 3, wherein the selectively disengaging means includes a rod for pivoting the cam-lock to disengage from the intermediate section of the leash, wherein disengagement of the cam-lock from the intermediate section of the leash allows the intermediate section of the leash to move freely through the housing.

5. The leash assembly of claim 3, wherein the cam-lock is spring biased to automatically engage the leash.

6. The leash assembly of claim 1, wherein the hand grip and the housing are of unitary construction.

7. The leash assembly of claim 1, wherein the leash handle abuts the housing in an area generally overlying the hand grip when the intermediate section of the leash is at maximum operative length.

8. A leash assembly, comprising:
a housing including a hand grip;
a leash including a first end, a second end defining a leash handle, and an intermediate section extendable and retractable through the housing;

controlling means for allowing travel of the leash in a first direction through the housing in response to pulling on the leash handle, and for simultaneously preventing travel of the leash in an opposite second direction through the housing, said controlling means including a spring-biased cam-lock for automatically engaging the intermediate section of the leash; and means for selectively disengaging the controlling means.

9. The leash assembly of claim 8, wherein the housing defines an interior passageway through which the intermediate section of the leash extends.

10. The leash assembly of claim 8, wherein the selectively disengaging means includes a rod for pivoting the cam-lock to disengage from the intermediate section of the leash, wherein disengagement of the cam-lock from the intermediate section of the leash allows the intermediate section of the leash to move freely through the housing.

11. The leash assembly of claim 8, wherein the hand grip and the housing are of unitary construction.

12. The leash assembly of claim 8, wherein the leash handle abuts the housing in an area generally overlying the hand grip when the intermediate section of the leash is at maximum operative length.

13. A leash assembly, comprising:
  a housing including an interior passageway and a hand grip;
  a leash including a first end, a second end defining a leash handle, and an intermediate section extendable and retractable through the housing interior passageway;
  controlling means for allowing travel of the leash in a first direction through the housing in response to pulling on the leash handle, and for simultaneously preventing travel of the leash in an opposite second direction through the housing, said controlling means including a spring-biased cam-lock for automatically engaging the intermediate section of the leash; and
  means for selectively disengaging the controlling means;
  wherein the selectively disengaging means includes a rod for pivoting the cam - lock to disengage from the intermediate section of the leash, and the disengagement of the cam-lock from the intermediate section of the leash allows the intermediate section of the leash to move freely through the housing interior passageway.

14. The leash assembly of claim 13, wherein the hand grip and the housing are of unitary construction.

15. The leash assembly of claim 14, wherein the leash handle abuts the housing in an area generally overlying the hand grip when the intermediate section of the leash is at maximum operative length.

16. A leash assembly, comprising a housing including a hand grip;
  a leash including a first end, a second end defining a leash handle, and an intermediate section extendable and retractable through the housing;
  a spring biased cam-lock having a friction point that comes into contact with the intermediate section of the leash, the cam-lock and friction point allowing travel of the leash in a first direction through the housing in response to pulling on the leash handle and simultaneously preventing travel of the leash in an opposite second direction through the housing; and
  a button and push rod assembly for selectively disengaging the cam-lock and friction point from the intermediate section of the leash.

17. The leash assembly of claim 16, wherein disengagement of the cam-lock and friction point from the intermediate section of the leash allows the intermediate section of the leash to move freely through the housing.

18. The leash assembly of claim 16, wherein the cam-lock is spring biased to automatically engage the leash.

19. The leash assembly of claim 16, wherein the hand grip and the housing are of unitary construction.

20. The leash assembly of claim 15, wherein the leash handle abuts the housing in an area generally overlying the hand grip when the intermediate section of the leash is at maximum operative length.

* * * * *